Feb. 12, 1957  H. J. KOERING  2,780,976
GARDEN TOOL
Filed June 4, 1954  2 Sheets-Sheet 1
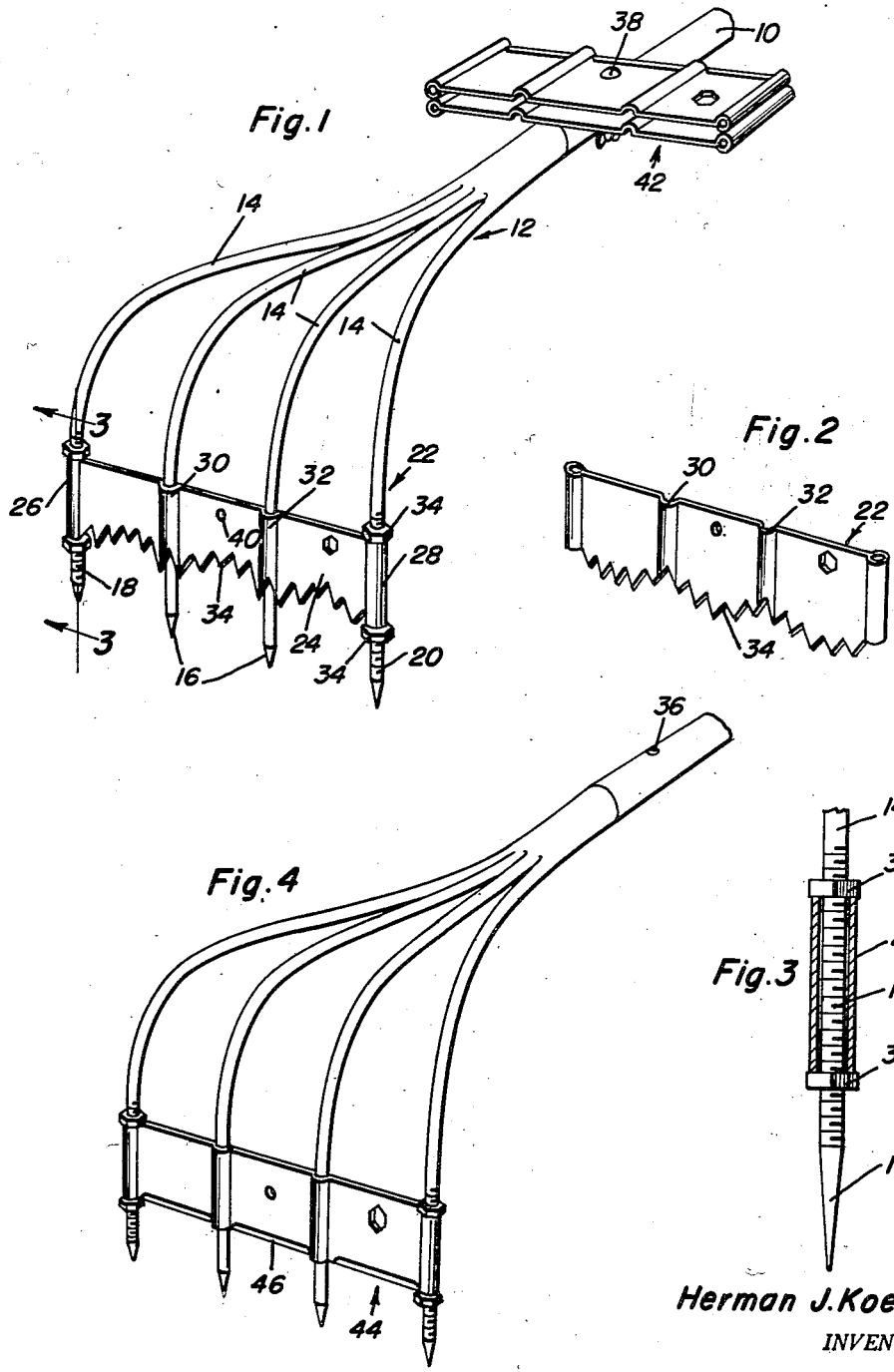
Herman J. Koering
INVENTOR.

Feb. 12, 1957 H. J. KOERING 2,780,976
GARDEN TOOL
Filed June 4, 1954 2 Sheets-Sheet 2

Herman J. Koering
INVENTOR.

2,780,976
GARDEN TOOL

Herman J. Koering, Chisholm, Minn.

Application June 4, 1954, Serial No. 434,357

2 Claims. (Cl. 97—62)

This invention relates to garden tools and pertains more particularly to an improved hoe and attachment therefor.

A primary object of this invention is to provide attachments for a cultivator hoe wherein different varieties of garden tool may be rapidly and easily effected by merely fastening one of the attachments to the conventional hoe.

Another object of this invention is to provide an improved hoe assembly incorporating a cutting blade attachment adjustably mounted thereon for simultaneously cultivating the soil upon which the hoe is used and pulling weeds therefrom.

Another object of this invention is to provide a cutting blade attachment for hoes adapted for adjustable mounting thereon for controlling the effect of the combined hoeing and cutting operation.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the hoe constructed in accordance with the invention and having the novel attachment secured thereto;

Figure 2 is a perspective view of one of the cutting blades;

Figure 3 is a vertical section taken substantially along the plane of section line 3—3 in Figure 1;

Figure 4 is a perspective view similar to Figure 1 but showing a modied form of cutting blade secured on the hoe;

Figure 5:
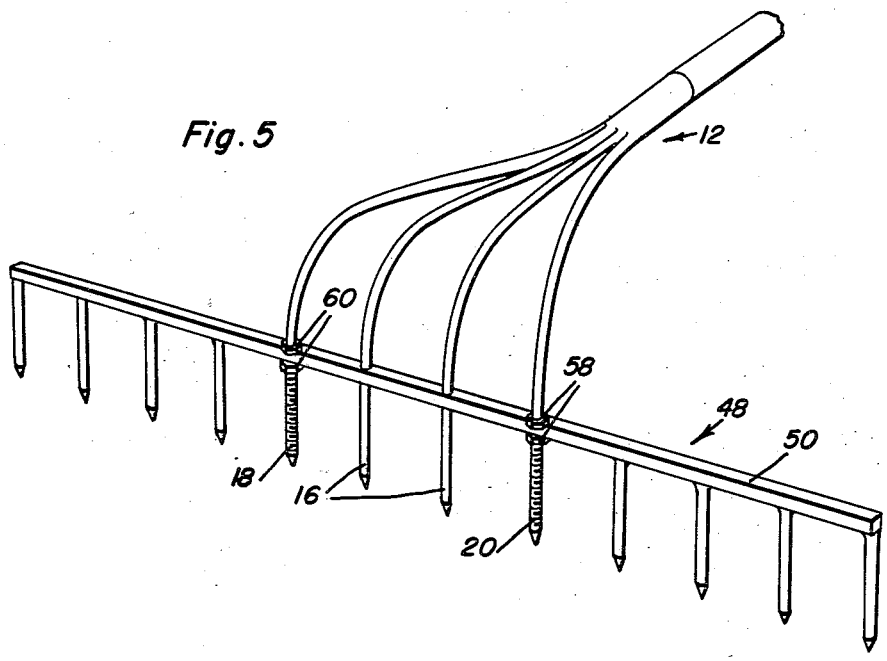
Figure 5 is a perspective view of a modified form of attachment in use.

Referring now more particularly to the drawings, it will be seen that the hoe assembly includes a handle portion 10 and a head assembly indicated generally by the reference character 12 which is provided with a plurality of spaced tine members 14 of conventional configuration and terminating in the usual pointed ends 16. The tines on the opposite end of the hoe are threaded as at 18 and 20 for a purpose which will be presently apparent. A cutting blade assembly is indicated generally by the reference character 22 and comprises an elongated cutting blade or plate 24 having its opposite end portions formed as cylindrical sleeve elements 26 and 28 to receive the aforementioned threaded end tines in the manner shown most clearly in Figure 3. Intermediate portions of the cutting blade are deformed in trough-like fashion as at 30 and 32 to receive and clear the intermediate tines of the whole head assembly. In this manner, the cutting edge 34 of the blade will lie along a plane passing through the centers of the tine members 14 for effecting the most desirable cutting action on the material being tilled.

To maintain the cutting blade on the tines, and to adjustably position the cutting edge of the blade toward and away from the free ends of the tines, the nut members 34 are provided on the threaded tine portions 18 and 20 at opposite ends of the sleeves 26 and 28 whereby manipulation of these nut members will effect the desired adjustment and maintain the blade in place. Thus, the depth of penetration of the soil below the point of cutting action of the cutting blade may be adjusted to suit varying conditions of the soil.

The hoe handle 10 is provided with a transverse bore 36 to receive a bolt and wing nut assembly 38 and each blade is provided with an aperture 40 permitting the bolt to project therethrough so that a plurality of blades, as indicated generally by the reference character 42, may be attached to the hoe in convenient position to perform the desired cutting action as may be required. In this respect, it will be noted that the modified form of blade shown in Figure 4 and indicated generally by the reference character 44 is provided with a straight cutting edge 46 which is most effective in cutting strips of sod from the ground. Other cutting edge formations may be provided as may be found desirable.

Figure 6:
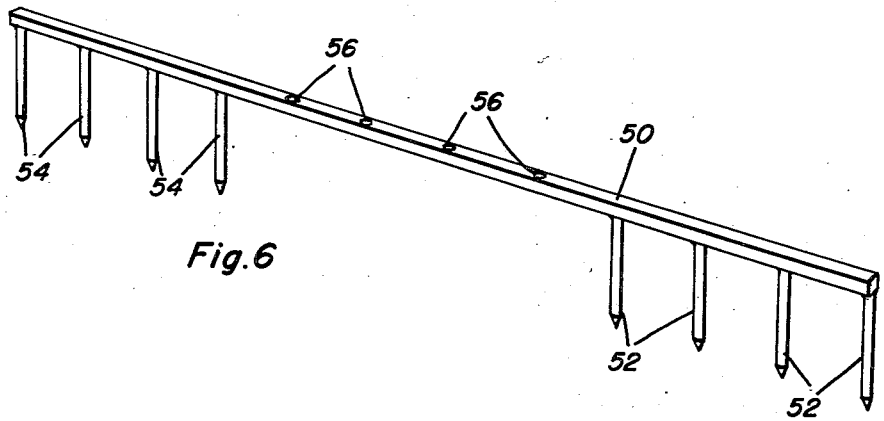
Figure 6 is a perspective view of the attachment shown in Figure 5.

Referring now more particularly to Figures 5 and 6 where a modified form of attachment is shown, it will be seen that the modification consists essentially of a rake member indicated generally by the reference character 48 which includes an elongated horizontal bar portion 50 from which depend a plurality of rake teeth or tines 52 adjacent one end thereof and a plurality of similar tines 54 at the opposite end thereof. The intermediate portion of the bar 48 is devoid of tines but is provided thereat with a series of longitudinally spaced openings or apertures 56 through which the previously mentioned tines 16, 18 and 20 of the hoe assembly 12 project. In this respect, it will be noted that the tines 16, 18 and 20 project through the bar 50 to a point substantially in alignment with the tines 52 and 54 of the attachment such that the assembly, as effected by the attachment 48 being secured to the hoe 12, presents a complete rake assembly having tines evenly spaced apart and extending the entire extent of its length.

Of course, the lock nuts 58 and 60 are disposed on opposite sides of the bar 50 in cooperation with the tines 18 and 20 of the hoe 12 for maintaining the attachment rigidly in place thereon. Thus, it will be readily appreciated that the cultivator hoe assembly 12 may be rapidly and easily converted to a broad rake assembly to attain the inherent advantages thereof.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is:

1. A garden hoe comprising a handle and a head portion attached thereto, said head portion including a plurality of end and intermediate digging tines having straight coplanar digging portions and a cutting blade attached to the digging portions of the end tines, the end tines on said head being threaded throughout a substantial extent of their digging portions, said cutting blade having its opposite ends formed as straight sleeves receiving said digging portions of said end tines and slidably adjustable thereon, and nut members engaged on said digging portions of said end tines for adjustably positioning said blade toward and away from the free ends of said digging portions, said blade between said digging portions being coplanar therewith.

2. In combination, a cultivating hoe having a plurality of equidistantly spaced coplanar end and intermediate tines, at least two of which are threaded throughout a substantial extent of their length, a garden tool attachment having a main body portion through which the threaded tines are projected, and lock nuts disposed on each threaded tine on opposite sides of the garden tool for rigidly securing the attachment to the cultivator hoe, said main body portion extending beyond the end tines in the plane thereof and having depending tines thereon spaced from said end tines coplanar therewith.

References Cited in the file of this patent

UNITED STATES PATENTS

| | | |
|---|---|---|
| 556,389 | Wheeler | Mar. 17, 1896 |
| 932,872 | King | Aug. 31, 1909 |
| 2,124,472 | Roberts | July 19, 1938 |
| 2,148,772 | Olson | Feb. 28, 1939 |
| 2,330,679 | Church | Sept. 28, 1943 |
| 2,370,208 | Terray | Feb. 27, 1945 |

FOREIGN PATENTS

| | | |
|---|---|---|
| 234,703 | Switzerland | Feb. 1, 1945 |